United States Patent
Magrath et al.

(10) Patent No.: US 6,776,122 B1
(45) Date of Patent: Aug. 17, 2004

(54) SEED STICK LOCKING HANGER

(75) Inventors: Stephen Magrath, Bloomfield, NJ (US); Vitor Oliveira, Kearny, NJ (US); George Engel, Edison, NJ (US)

(73) Assignee: The Hartz Mountain Corporation, Secaucus, NJ (US)

( * ) Notice: Subject to any disclaimer, the term of this patent is extended or adjusted under 35 U.S.C. 154(b) by 0 days.

(21) Appl. No.: 10/640,338

(22) Filed: Aug. 12, 2003

Related U.S. Application Data

(60) Provisional application No. 60/461,451, filed on Apr. 9, 2003.

(51) Int. Cl.[7] .......................... A01K 31/06; A01K 39/01
(52) U.S. Cl. ........................................ 119/467; 119/464
(58) Field of Search ................................ 119/464, 465, 119/466, 467

(56) References Cited

U.S. PATENT DOCUMENTS

| | | | |
|---|---|---|---|
| 281,993 A | | 7/1883 | Goldstein |
| 1,810,836 A | | 7/1931 | Laubenstein |
| 1,843,864 A | * | 2/1932 | Burnett ...................... 119/464 |
| 1,979,057 A | * | 10/1934 | Tomlinson .................. 119/464 |
| 2,306,312 A | | 12/1942 | Hyde |
| 2,709,985 A | * | 6/1955 | Clauson ..................... 119/464 |
| 2,783,155 A | | 2/1957 | Haug |
| 3,175,536 A | | 3/1965 | Hilaire |
| 3,200,790 A | | 8/1965 | Anderson |
| 3,595,209 A | | 7/1971 | Parker |
| 4,135,692 A | | 1/1979 | Ferguson |
| 4,215,652 A | | 8/1980 | Kerscher |
| 4,602,757 A | | 7/1986 | Signorelli |
| 4,611,556 A | | 9/1986 | Frank |
| 4,667,913 A | | 5/1987 | Peelle et al. |
| 4,996,947 A | | 3/1991 | Petrides |
| 5,002,187 A | | 3/1991 | Rysner et al. |
| D316,673 S | | 5/1991 | Rysner et al. |
| 5,033,708 A | | 7/1991 | Brue et al. |
| 5,323,995 A | | 6/1994 | Grittman et al. |
| D353,535 S | | 12/1994 | Grittman et al. |
| 5,452,682 A | | 9/1995 | Bescherer et al. |
| 5,664,754 A | | 9/1997 | Gaenslen |
| 5,875,735 A | | 3/1999 | Bradley et al. |
| D427,744 S | | 7/2000 | Loehndorf |
| 6,085,691 A | | 7/2000 | Loehndorf |
| 6,142,100 A | * | 11/2000 | Marchioro .................. 119/464 |
| 6,207,440 B1 | | 3/2001 | Hovanec |
| 6,265,206 B1 | | 7/2001 | Hovanec |
| 6,268,154 B1 | | 7/2001 | Hovanec |
| 6,374,772 B1 | * | 4/2002 | Brandt ...................... 119/467 |
| 6,435,134 B1 | * | 8/2002 | Ho ............................. 119/464 |

* cited by examiner

Primary Examiner—Charles T. Jordan
Assistant Examiner—Elizabeth Shaw
(74) Attorney, Agent, or Firm—Jeffrey M. Kaden; Gottlieb, Rackman & Reisman, P.C.

(57) ABSTRACT

A hanger design to which a conglomeration of seed, treat or other food product may be adhered and which can be easily Installed and effectively secured to most animal cages is provided. The hanger of the invention includes a shaft having a plate disposed at one end in a plane which is substantially perpendicular to the direction of the shaft. The plate has an outside surface formed with a pair of vertical ribs and an extending horizontal locking tab which together can be used to lock the hanger unit to a conventional animal cage.

21 Claims, 2 Drawing Sheets

SEED STICK LOCKING HANGER

CROSS REFERENCE TO RELATED APPLICATION

This application claims priority of provisional application Ser. No. 60/461,451, filed Apr. 9, 2003.

BACKGROUND OF THE INVENTION

The invention relates generally to a hanging support structure to which a conglomeration of seed treats or other animal food can be adhered and which can be easily fastened to a small animal cage or other supporting type device.

Many types of pets, such as birds, gerbils, mice and rabbits, are normally maintained in an animal cage that comprises a series of vertically and horizontally directed metal slats. These types of animals require a diet that includes a variety of food products. The difficulty is how to provide the food products to the pet animal in a way in which the animal can eat at a time of its selection. One such method Is providing a pre-formed food conglomeration held together by some type of sticky material and then placed or hung inside the cage of the animal so that the animal can eat as desired.

Conventional hanger devices used for supporting such a conglomeration of food are often times difficult to install, and therefore, it is desirable to provide an improved food or treat hanger design that may be easily installed in the animal cage without having to use any type of additional parts in order to effectuate the installation. It is also desirable to provide a food or treat hanger design which effectively retains the food conglomeration along the hanger.

SUMMARY OF THE INVENTION

Generally speaking, and in accordance with the invention, a hanger design to which a conglomeration of seed, treat or other food product may be adhered and which can be easily installed and effectively secured to most animal cages is provided. The hanger of the invention includes a shaft having a plate disposed at one end in a plane which is substantially perpendicular to the direction of the shaft. The plate has an outside surface formed with a pair of vertical ribs and an extending horizontal locking tab which together can be used to lock the hanger unit to a conventional animal cage.

In use, the plate of the hanger is disposed along the inside of the cage such that the extending locking tab is fitted through a pair of adjacent wire elements which define the animal cage. The locking tab is then rotated so that it is disposed perpendicularly to the wire elements, thereby enabling the pair of horizontal ribs formed along the plate to fit about the two wire elements. As a result, the hanger unit is secured along the cage. In other words, the pair of ribs prevents the hanger unit from rotating once it has been locked into position.

It is therefore an object of the present Invention to provide an improved hanger device to which a conglomeration of seed, treat and other food is adhered.

Still another object of the invention is to provide a food hanger which is easily installed and effectively secured to most animal cages.

Yet a further object of the invention is to provide an improved food hanger which does not require any additional parts in order for it to be secured to an animal cage.

Still other objects and advantages of the invention will in part be obvious and will in part be apparent from the following description.

The invention comprises the features, elements and arrangements of parts described in the following description, and the scope of the invention will be indicated in the claims.

BRIEF DESCRIPTION OF THE DRAWINGS

For a fuller understanding of the invention, reference is made to the following description, taken in connection with the accompanying drawings in which.

DETAILED DESCRIPTION OF THE PREFERRED EMBODIMENT

Figure 1:
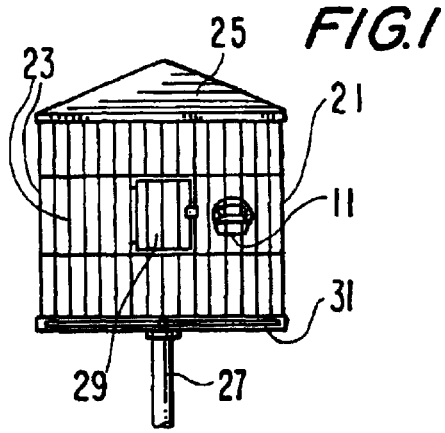
FIG. 1 is a front elevational view of a conventional wire bird cage having a hanger of the invention secured thereto.

Referring first to FIG. 1, a wire cage for housing a bird or other pet of the type well known in the prior art and generally Indicated at 21 Is shown. Cage 21 is supported on a supporting pole 27, and is defined by a roof 25, a base 31, and a plurality of vertically directed wire elements 23. Along a portion of wire elements 23 is formed a wire door 29 through which a pet bird or other animal may be passed.

Figure 2:
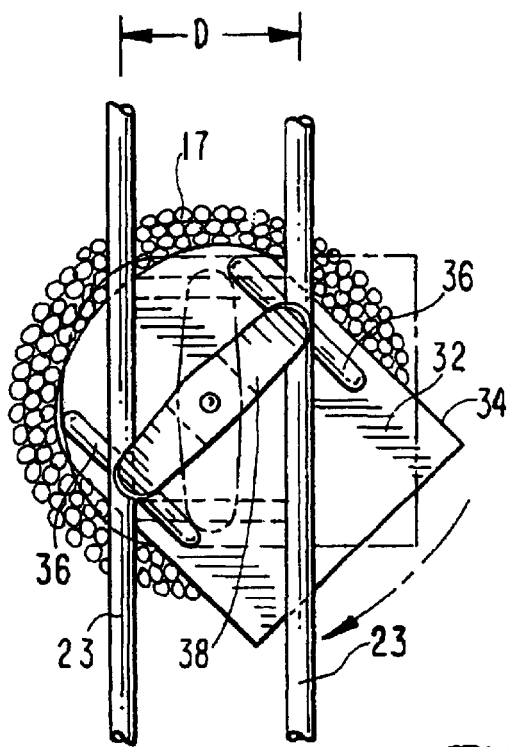
FIG. 2 is a front elevational view showing the details of the hanger as it is being attached to wire bird cage.
Figure 3:
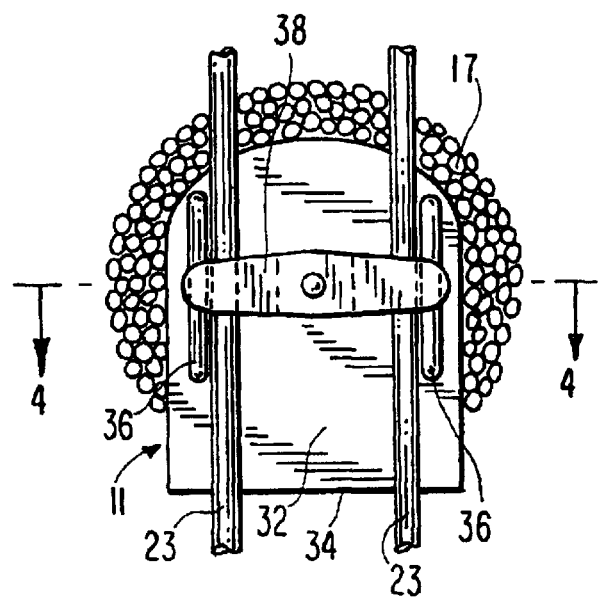
FIG. 3 is a front elevational view showing the inventive hanger secured to the wire bird cage.
Figure 4:
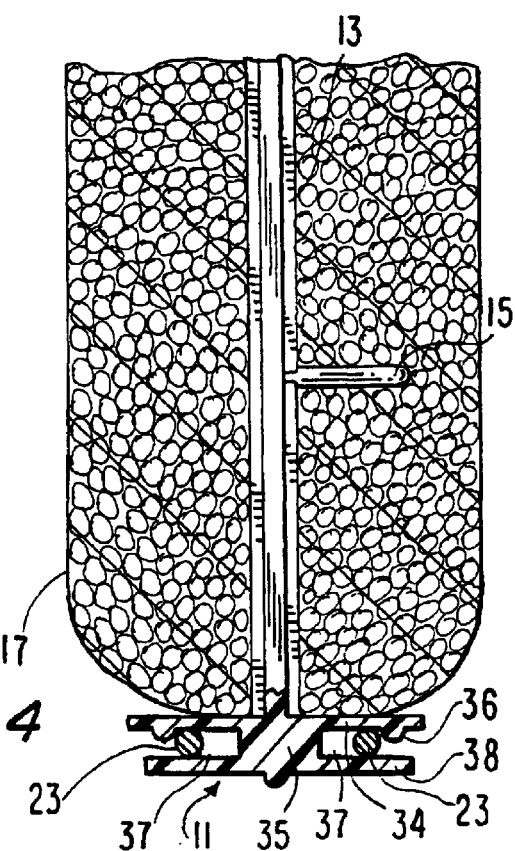
FIG. 4 is a cross-sectional view taken along lines 4—4 of FIG. 3.

As shown in FIG. 1, and in more detail in FIGS. 2–4, a locking hanger made in accordance with the invention and generally indicated at 11 is secured to cage 21 along vertical wire elements 23, as will be described in greater detail hereinbelow. Hanger 11 is typically formed from a plastic material and includes a shaft 13 and a top plate 34. A conglomeration of seed, treat or other food product 17 is molded along the length of shaft 13 and is held together typically by some type of edible gummy base or sticky material such as honey or dextrose. Shaft 13 has a cross-shaped configuration in cross-section which enhances the rigidity and strength thereof.

Shaft 13 of hanger 11 also includes a post 15 extending substantially perpendicularly therefrom. Post 15 helps support shaft 13 of hanger 11 and thus prevents it from bending as food conglomeration 17 is formed therearound or removed therefrom when being eaten by a pet animal.

Plate 34 of hanger 11 has an outside portion 32 which faces away from shaft 13 and which is formed with a pair of vertically running and protruding ribs 36. Ribs 36 are spaced from one another a distance greater than the distance D between adjacent vertical wire elements 23 of cage 21. Extending from plate 34 and between ribs 36 is a spacing finger member 35 leading to an integrally formed horizontal tab 38. Tab 38 runs parallel to plate 34 and defines a pair of locking compartments 37, as best shown in FIG. 4.

In use, hanger 11 formed with food conglomeration 17 therearound is first placed through door 29 and into cage 21. Then, horizontal tab 38 is slid between a selected pair of adjacent wire elements 23—this is achieved by maintaining horizontal tab 38 parallel to wire elements 23. Once tab 38 extends past wire elements 23, the hanger is rotated, as shown in FIG. 2, until tab 38 is disposed in an orientation perpendicular to wire elements 23, as shown in FIG. 3. In this position, vertical ribs 36 prevent further rotation of hanger 11 and tabs 38 are thus able to capture wire elements 23 within compartments 37 (see FIG. 4) and thereby engage hanger 11 to cage 23.

Figure 5:
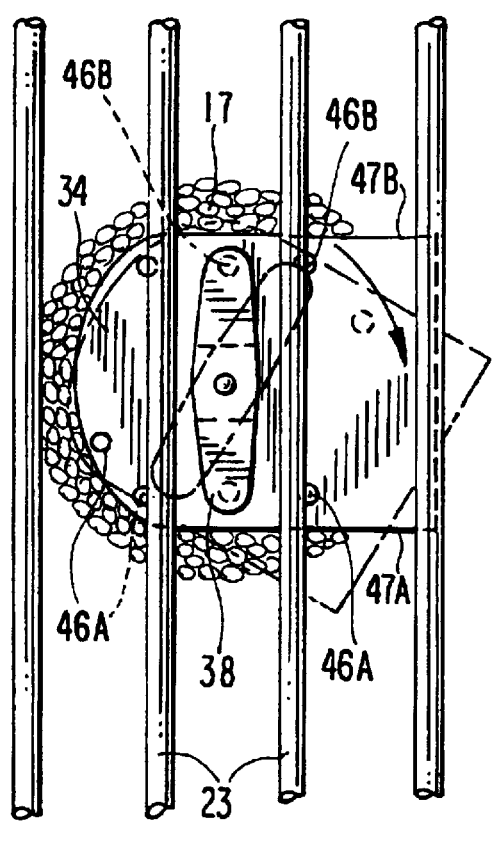
FIG. 5 is a front elevational view of an alternative embodiment of the inventive hanger prior to securement to the wire bird cage.
Figure 6:
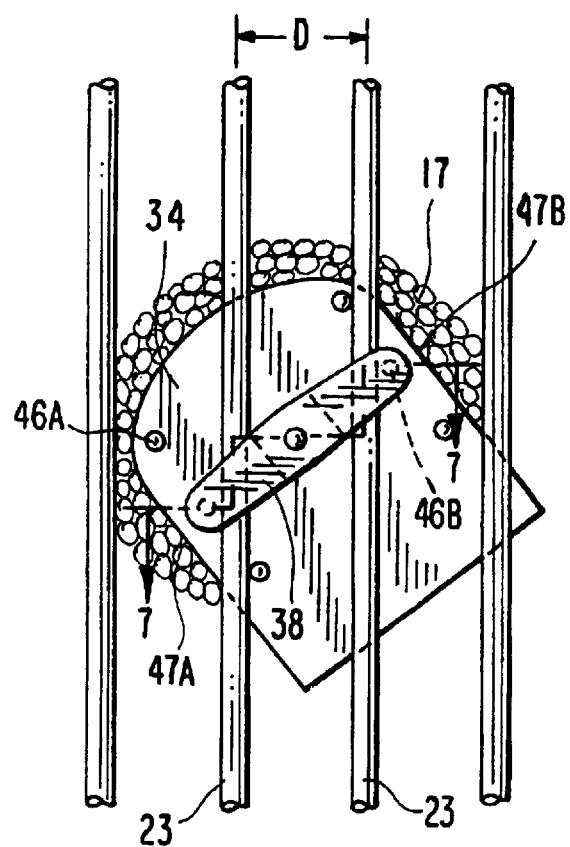
FIG. 6 is similar to FIG. 5 and shows the hanger unit as it is being attached to the wire cage.
Figure 7:
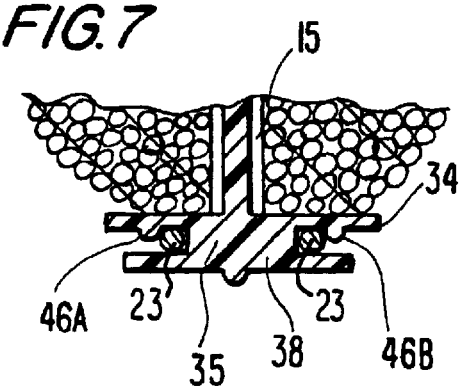
FIG. 7 is a cross-sectional view taken along line 7—7 of FIG. 6.

In an alternative embodiment, as best shown in FIGS. 5–7, top plate 34 of hanger 11 is formed with a series of corresponding dimples 46a and 46b. Dimples 46a are three in number and are disposed in alignment with one another adjacent to one edge 47a of plate 34. Dimples 46b are also disposed in alignment with one another and adjacent to the other edge 47b of plate 34. Dimples 46a and 46b serve the same purpose as vertical ribs 36 of the hanger design depicted in FIGS. 1–4, and thus are used to facilitate coupling hanger 11 along wire elements 23 of cage 21, as shown in FIGS. 6 and 7. As before, the distance separating aligned dimples 46a and 46b must be greater than the distance between adjacent wire elements 23.

Figure 8:
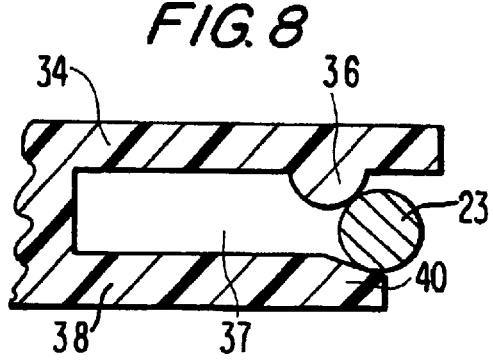
FIG. 8 is a cross-sectional view showing a locking tab of the inventive hanger being formed with a beveled edge in order to facilitate coupling of the hanger to the wire bird cage.
Figure 9:
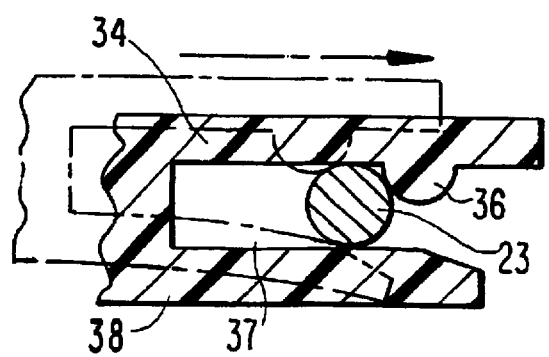
FIG. 9 is a cross-sectional view showing the hanger of the invention with the locking tab of FIG. 8 coupled to the wire cage.

In FIGS. 8–9, horizontal locking tab 38 is shown formed optionally with a beveled edge 40 to facilitate engagement of wire elements 23 thereto during rotation of hanger 11 and thus capture wire elements 23 of cage 21 within compartments 37.

It will thus be seen that the objects set forth above, among those made apparent from the preceding description, are efficiently attained and, since certain changes may be made in the construction of the invention without departing form its spirit and scope, it is intended that all matter contained in the description or shown in the drawings shall be interpreted as Illustrative and not in a limiting sense.

It is also understood that the following claims are intended to cover all of the generic and specific features of the invention described herein and all statements of the scope of the invention, of which, as a matter of language, might be said to fall therebetween.

What is claimed is:

1. A hanger for use in conjunction with an animal cage comprising:
   a shaft having a plate disposed at one end in a plane substantially perpendicular to said shaft, wherein said plate has an outside surface facing away from said shaft and is formed with at least one substantially vertically running protrusion and a horizontally directed locking tab spaced away from said plate surface.

2. The hanger of claim 1, wherein said shaft has a conglomeration of seed, treat or other food molded thereon.

3. The hanger of claim 1, wherein said shaft includes a post extending substantially perpendicular therefrom.

4. The hanger of claim 1, wherein said at least one protrusion comprises at least one substantially vertically directed rib.

5. The hanger of claim 4, wherein said at least one rib comprises a pair of spaced ribs.

6. The hanger of claim 5, wherein said ribs are spaced from one another in order to accommodate a pair of wire elements of said cage therebetween.

7. The hanger of claim 1, wherein said locking tab has at least one end formed with a beveled surface.

8. The hanger of claim 1, wherein said plate and said locking tab define a space therebetween adjacent said at least on protrusion through which a wire element of said cage is engagingly disposed.

9. The hanger of claim 1, wherein said at least one protrusion comprises a series of dimples.

10. The hanger of claim 9, wherein said series of dimples are aligned with one another along said plate outside surface.

11. The hanger of claim 1, wherein said shaft has a substantially cross-shaped configuration in cross-section.

12. A system for maintaining a pet or other animal comprising:
   a cage defined by the plurality of substantially parallel wire elements spaced from one another; and
   a hanger element having a plate disposed at one end in a plane substantially perpendicular to a shaft, said plate having an outside surface facing away from such shaft and formed with at least one substantially vertically running protrusion and a horizontally directed locking tab spaced away from said plate surface.

13. The system of claim 12, wherein said shaft has a conglomeration of seed, treat or other food molded thereon.

14. The system of claim 12, wherein said shaft includes a post extending substantially perpendicular therefrom.

15. The system of claim 12, wherein said at least one protrusion comprises at least one substantially vertically directed rib.

16. The system of claim 15, wherein said at least one rib comprises a pair of spaced ribs.

17. The system of claim 16, wherein said ribs are spaced at a distance from one another in order to accommodate a pair of said wire elements of said cage.

18. The system of claim 12, wherein said locking tab has at least one end formed with a beveled surface.

19. The system of claim 12, wherein said plate and said locking tab define a space therebetween adjacent said at least one protrusion through which one of said wire elements of said cage is engagingly received.

20. The system of claim 17, wherein said pair of wire elements are separated at a distance between one another less than the distance between said spaced ribs.

21. The system of claim 12, wherein said shaft has a substantially cross-shaped configuration in cross-section.

* * * * *